United States Patent [19]
Takahashi et al.

[11] Patent Number: 6,163,668
[45] Date of Patent: Dec. 19, 2000

[54] MULTI-FUNCTIONAL COPIER AND PRINTING APPARATUS WHICH PROVIDES VARIOUS OPTIONS FROM WHICH TO READ IN, OUTPUT AND DISPLAY IMAGES

[75] Inventors: Masaki Takahashi; Hiroyuki Ichiyoshi; Hiroaki Sasaki, all of Yokohama, Japan; Yosuke Osawa, Glen Cove, N.Y.; Nobuyuki Imai, Kitamine-machi, Japan; Yasunori Senshiki, Kunitachi, Japan; Tatsuya Hisatomi, Tokyo, Japan

[73] Assignee: Canon Kabushiki Kaisha, Tokyo, Japan

[21] Appl. No.: 09/215,462

[22] Filed: Dec. 17, 1998

[30] Foreign Application Priority Data

Dec. 22, 1997 [JP] Japan .................................... 9-352936

[51] Int. Cl.[7] ............................ G03G 15/00; G03G 21/16
[52] U.S. Cl. ........................ 399/144; 345/156; 399/151; 399/377; 399/379; 399/380
[58] Field of Search ................................ 399/7, 151, 205, 399/365, 379, 380, 377, 371, 372; 345/156, 173, 905

[56] References Cited

FOREIGN PATENT DOCUMENTS 5-341605  12/1993  Japan .
7-200246   8/1995  Japan .
8-171325   7/1996  Japan .

*Primary Examiner*—Arthur T. Grimley
*Assistant Examiner*—Quana Grainger
*Attorney, Agent, or Firm*—Fitzpatrick, Cella, Harper & Scinto

[57] ABSTRACT

A composite apparatus includes a business-machine main-body apparatus having at least a copying function and a printer function, and a display device, also operating as an original-pressing plate, having a flat display surface for displaying an operational function and other information. The display device is provided above an original-reading device of the main-body apparatus. By allowing an operation using the display device from a plurality of sides of the main-body apparatus, the range of selection of location of the composite apparatus is widened, and the operability of the composite apparatus is improved.

13 Claims, 15 Drawing Sheets

MULTI-FUNCTIONAL COPIER AND PRINTING APPARATUS WHICH PROVIDES VARIOUS OPTIONS FROM WHICH TO READ IN, OUTPUT AND DISPLAY IMAGES

BACKGROUND OF THE INVENTION

1. Field of the Invention

The present invention relates to an original-reading apparatus and an output apparatus for forming and copying a document, a facsimile apparatus for transmitting/receiving the contents of an original to a remote location, a composite apparatus including the functions of these apparatuses, and a composite apparatus for business use having a two-way communication function for performing, for example, a video conference effected by being connected to a communication network, such as a computer network or the like.

2. Description of the Related Art

A document formed currently in the office work place is copied and output by a copier, a printer or the like, and the contents of the document are transmitted by a facsimile apparatus. In the process of forming the document, an apparatus, such as a computer, a copier, a printer or the like, which is suitable for each object, is selectively used. When communicating with a remote location, an individual apparatus, such as a telephone, a facsimile apparatus, a video conferencing system or the like, is selectively used depending on the purpose.

For example, as shown in FIG. 17, in a copier which is used for copying and outputting a document, an original-reading device 102 having an original-mount is provided at an upper portion, and a recording sheet is discharged onto a discharged-sheet tray 123 provided at a side of a main body 101. In a printer, a recording sheet is discharged onto a discharged-sheet tray provided at an upper portion, a front portion or a side portion. In a facsimile apparatus, an original is inserted and read from a front portion or a top portion of the main body, and the original or a reception sheet is discharged from a rear portion, a front portion or a side portion.

As described above, in all the apparatuses, the direction of operation of an original or a recording sheet, or the direction of operation on an operation panel is limited to one direction.

Since the direction of operation in most conventional apparatuses is limited to one direction as described above, for example, as shown in FIG. 18, apparatuses, such as a scanner 50, printers 60, a copier 70, a facsimile apparatus 80, a minicopier 90 and the like, are often disposed so as to face a wall on a floor or disposed on desks independently or as a group. Users sharing these apparatuses cannot use each apparatus from the back or a side of the apparatus.

On the other hand, when a plurality of users intend to appropriately use respective apparatuses by disposing them on desks or a floor, the desks can be disposed only in the same direction as the operational surfaces of the apparatuses, thereby limiting the number of the users. As a result, the degree of freedom in the arrangement of the apparatuses and the desks is limited by the control panel position of the apparatus.

In order to solve such problems, an approach which allows the use of operation panels from the four faces of each apparatus may be considered.

In this approach, however, it is necessary to also dispose operation panels on the second through fourth faces of the main body of the apparatus. Furthermore, for example, it is necessary to provide a plurality of operation units, and to prohibit the use of other operation panels when one operation panel is operated. Hence, this approach is unrealistic.

An output sheet is taken out by discharging the corresponding recording sheet onto a discharged-sheet tray provided on the main body of the apparatus. In the case of the copier shown in FIG. 17, if desks are disposed in front of and at the back of the copier, it is possible to take out a recording sheet from a position in front of or at the back of a discharged-sheet tray 123 provided at a side of the main body of the copier. However, since an operation unit 150 is provided only at a front portion of the copier, and an original-fixing plate (hereinafter termed a "pressing plate") 103 of a reading mount (hereinafter termed an "original-mount") can be opened only from the front side, it is impossible to consistently perform operations from reading of an original to obtainment of a recording sheet from both sides of the desks.

Recently, there is an increasing number of composite apparatuses in which the functions of a facsimile apparatus and a printer are added to the function of a copier. When using such a composite apparatus, an operation of only taking out a recording sheet output when the apparatus is used as a printer or a facsimile apparatus can be performed even from the back side of the discharged-sheet tray, and the operation can be performed from the front or back side of the apparatus. However, when using the apparatus as a facsimile apparatus for transmission or when using the reading device provided at the upper surface of the apparatus in order to copy an original or provide data of the original, it is necessary to operate the apparatus from the front side thereof. That is, the current composite apparatuses are not configured so as to allow all operations from many directions.

In contrast to trouble shooting processing for a sheet jam or the like which is performed by opening a front cover 100 as shown in FIG. 19, it is necessary to replenish frequently recording sheets by drawing out a sheet cassette 124 as shown in FIG. 20. In most conventional apparatuses inclusive of composite apparatuses, such a sheet cassette can be drawn only toward the front side of the apparatus, so that the user facing the back of the apparatus cannot replenish recording sheets.

SUMMARY OF THE INVENTION

The present invention has been made in consideration of the above-described problems.

It is an object of the present invention to provide a composite apparatus for business use which allows operations from many directions and an efficient office layout.

According to one aspect, the present invention which achieves the above-described object relates to a composite apparatus for business use including a business-machine main-body apparatus having at least a copying function and a printer function, and display means, also operating as an original-pressing plate, having a flat display surface for displaying an operational function and other information. The display means is provided above the original-reading means of the main-body apparatus.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described with reference to the drawings.

Figure 1:
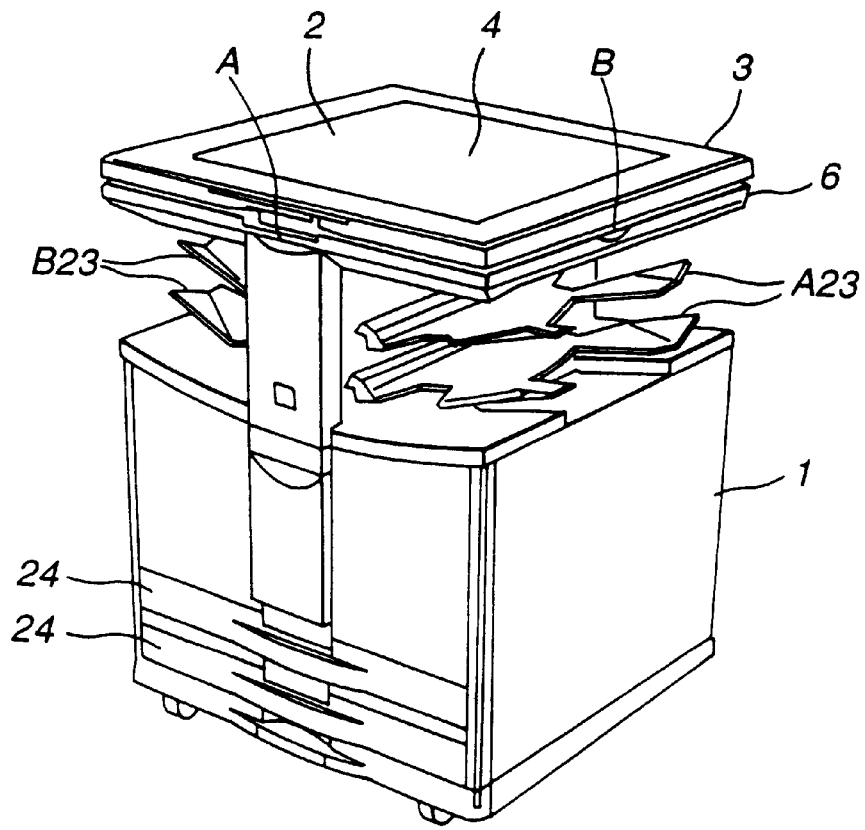
FIG. 1 is a perspective view illustrating a composite apparatus according to an embodiment of the present invention.

FIG. 1 is a perspective view illustrating a composite apparatus according to the embodiment. The composite apparatus includes an original-mount 6 and an original-pressing plate 3 provided above a main body 1.

Figure 2:
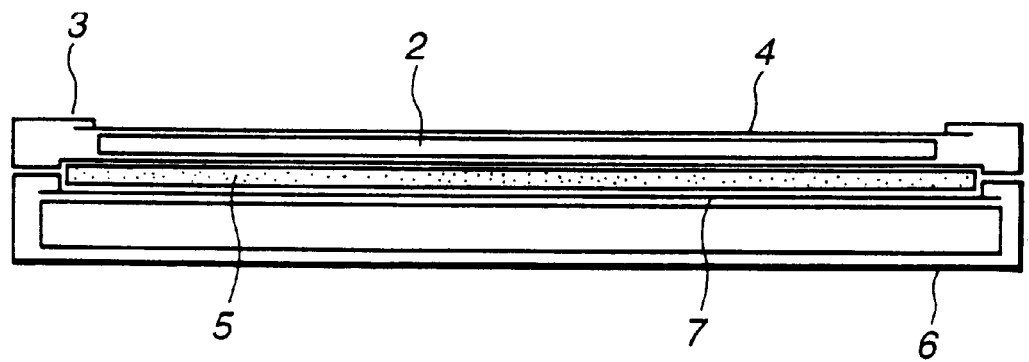
FIG. 2 is a cross-sectional view illustrating a portion including an original-pressing plate of the composite apparatus shown in FIG. 1.

The original-pressing plate 3 is configured as shown in FIG. 2.

FIG. 2 is a cross-sectional view illustrating a portion including the original-pressing plate 3 of the composite apparatus. As shown in FIG. 2, a thin flat display device 2 having a contact-type coordinate reading device 4 provided thereon is incorporated in the original-pressing plate 3. The display device 2 is electrically connected to the main body 1 by means of a single line. A cushion member 5 having a white sheet bonded thereto is attached to the back of the original-pressing plate 3. The original-pressing plate 3 holds and fixes an original with original-mount glass 7 of the original-mount 6.

Figure 3:
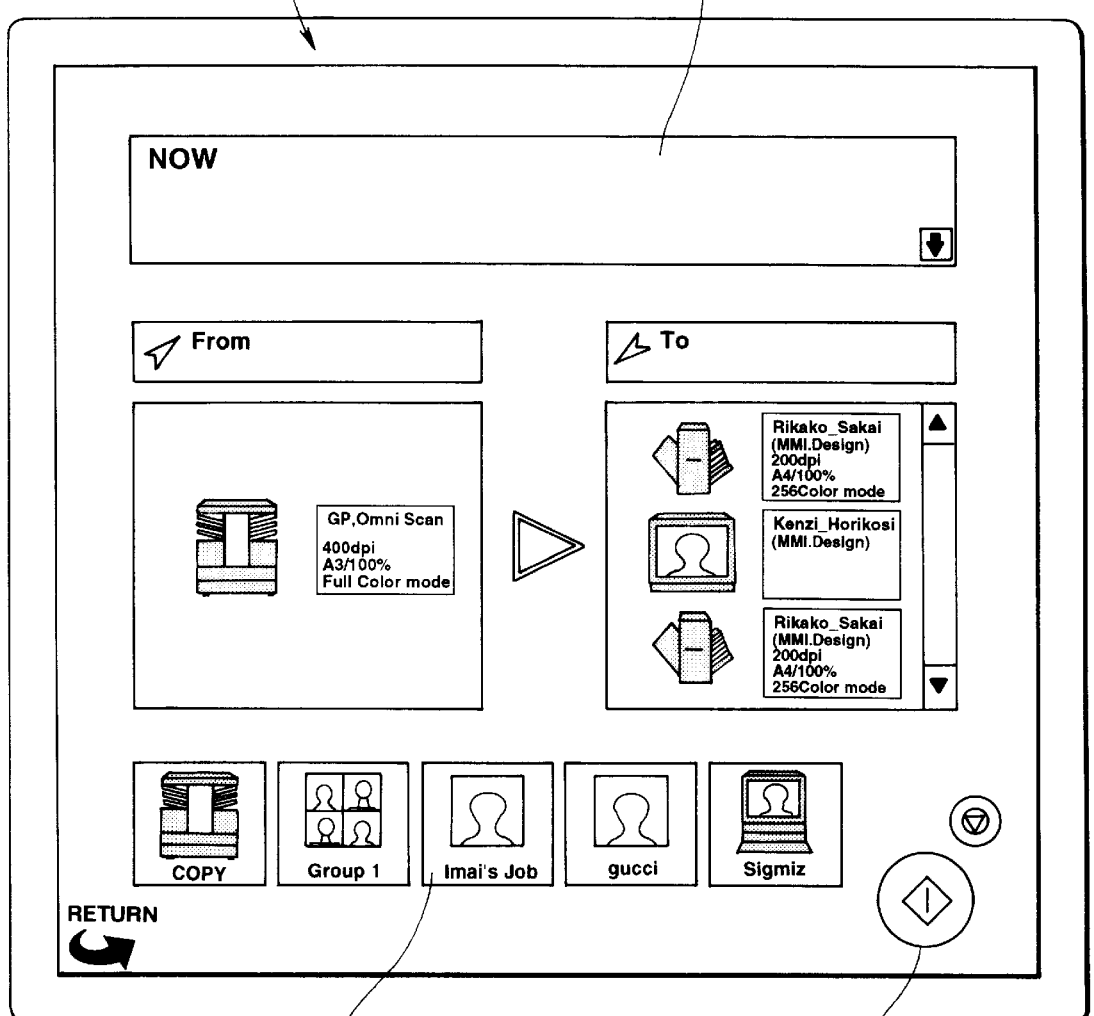
FIG. 3 is a diagram illustrating an operational picture surface of a splay device.

FIG. 3 illustrates a picture surface displayed on the display device 2.

By reading the coordinate position of an operation-key image on an operational picture surface A displayed on the display device 2 as shown in FIG. 3 by the contact-type coordinate reading device 4 shown in FIG. 2, the operation-key image displayed on the display device 2 operates as an input key.

Figure 4:
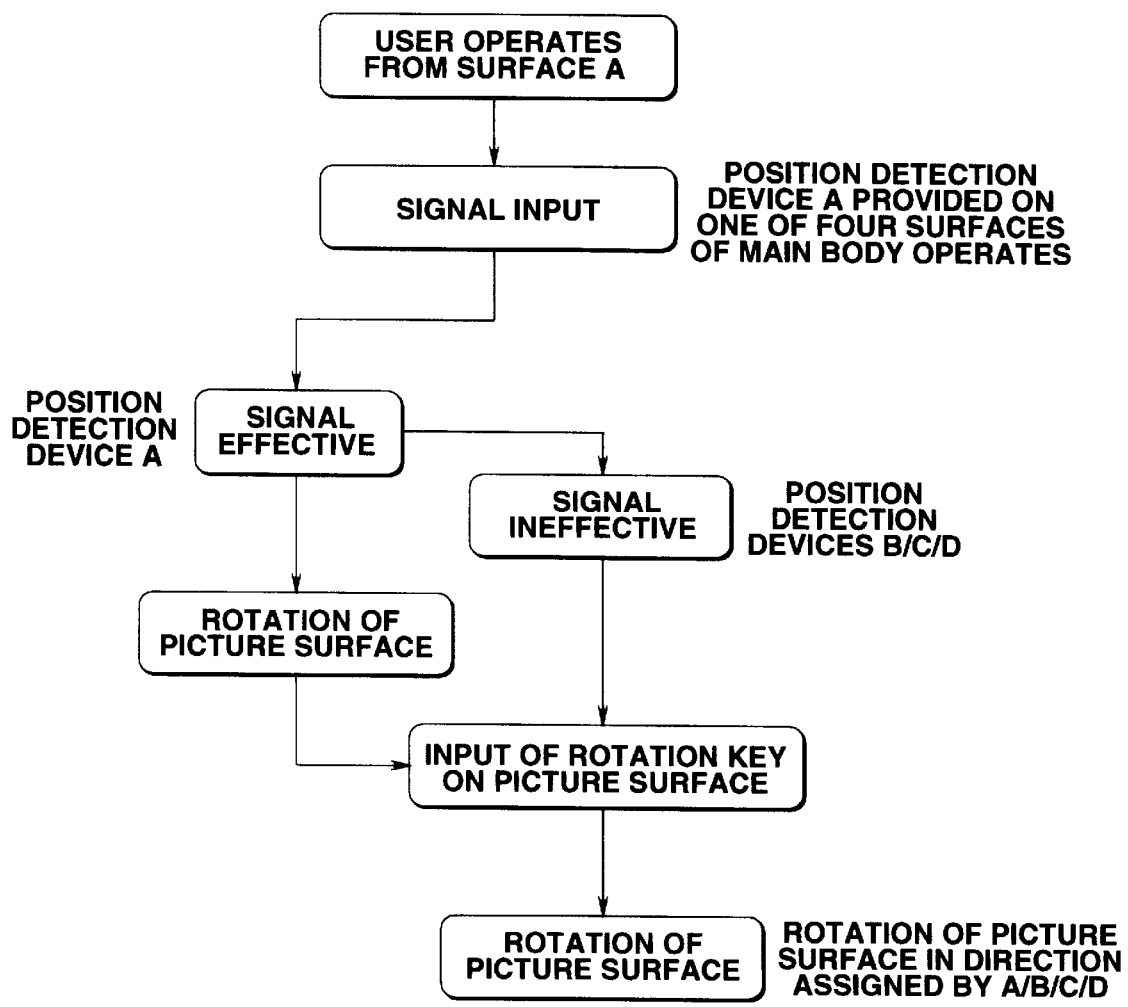
FIG. 4 is a flowchart illustrating an operation of rotating the operational picture surface of the display device.

As shown in FIG. 1, position detection devices A, B, C and D, each including an infrared emitting device, a photo-sensor and the like, are disposed at four sides of the original-mount 6 constituting an original-reading unit of the main body 1. By using the position detection devices A, B, C and D it is possible to detect at which side of the four sides the operator or the user (hereinafter termed the "user") is present. As a result, the operational picture surface A is displayed so as to be observed from the direction of the detected side. FIG. 4 is a flowchart illustrating the operational flow when the user operates from a surface A (the surface at the side where the position detection device A is present).

That is, when the user operates from the surface A, a signal is input from the surface A to operate the position detection device A. The signal from the position detection device A is made effective, signals from the position detection devices B—B are made ineffective, and the picture surface is rotated in the assigned direction by an input operation of a rotation key on the picture surface.

Figure 5:
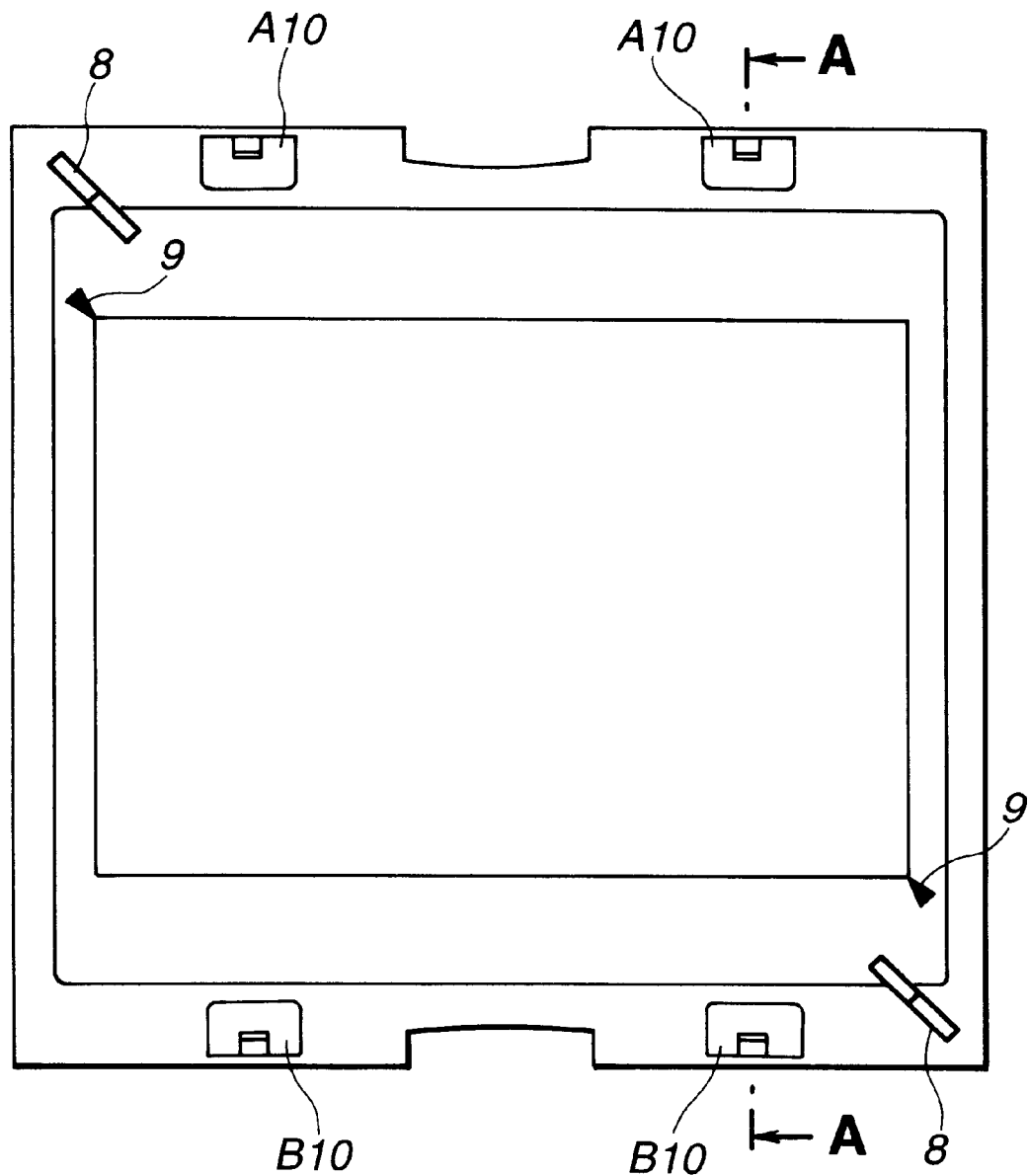
FIG. 5 is a plan view illustrating an original-mount of the composite apparatus shown in FIG. 1.

When reading a thick original, such as a book or the like, since the original-pressing plate 3 is used in an opened state or in a half opened state, an operational portion on the display device 2 cannot be used. Accordingly, when using the composite apparatus as a copier, as shown in FIG. 5, original-copying start keys 8 are provided at right and left portions of the top plate of the original-mount 6. It is thereby possible to provide a processing start command after performing various kinds of setting, such as setting of the number of copies, adjustment of the reading/copying density, and the like. When using the composite apparatus as a scanner, original-reading start keys are provided at right and left portions of the top plate of-the original-mount 6.

FIG. 5 is a plan view of the original-mount 6. As shown in FIG. 5, by providing at least two start keys 8 at corners where two sides cross, it is possible to operate the start keys 8 from two sides. If necessary, start keys may be provided at four corners. When providing the two start keys 8, by providing original-contact references at two facing corners of the original-mount glass 7, it is possible to use an original-contact reference 9 which is remote from the user even when reading an original larger than the original-mount 9, such as a panel or the like, so that the original does not contact hinges A10 or B10 of the original-pressing plate 3.

Figure 6:
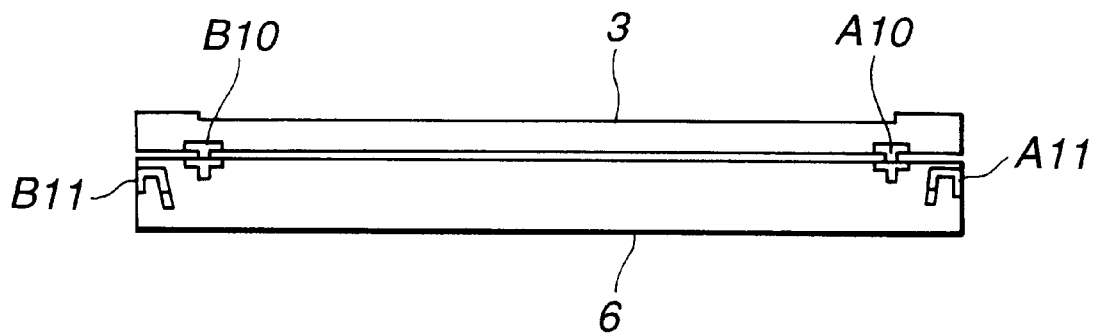
FIG. 6 is a cross-sectional view taken along line A—A shown in FIG. 5.
Figure 7:
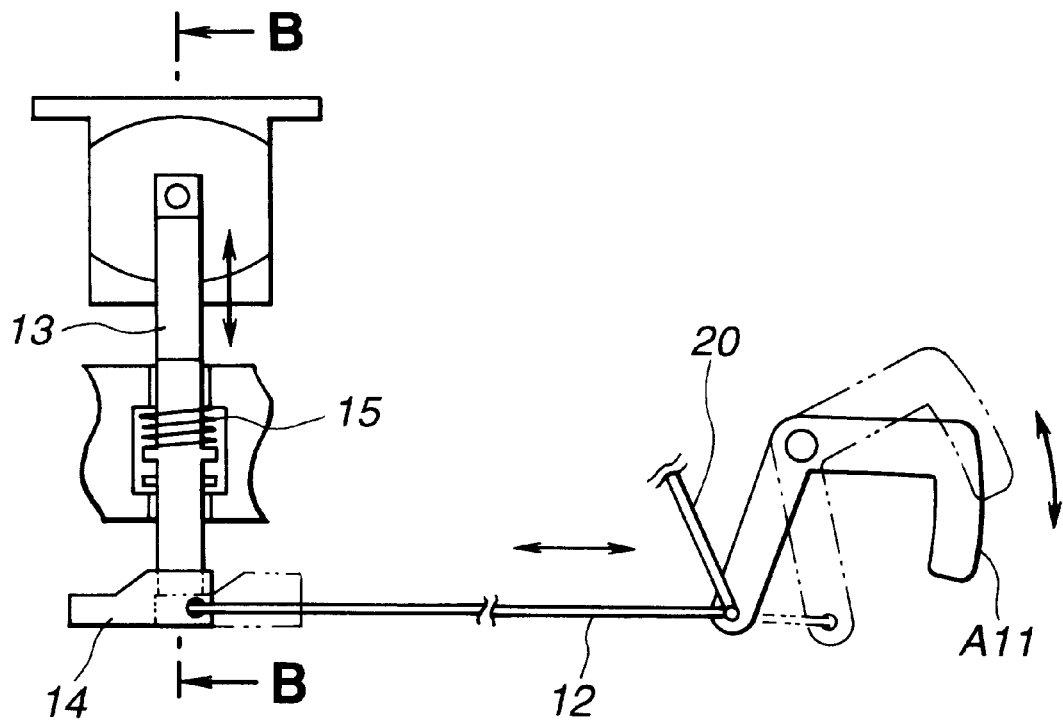
FIG. 7 is a side view illustrating the configuration of a locking mechanism for the original-pressing plate.
Figure 8:
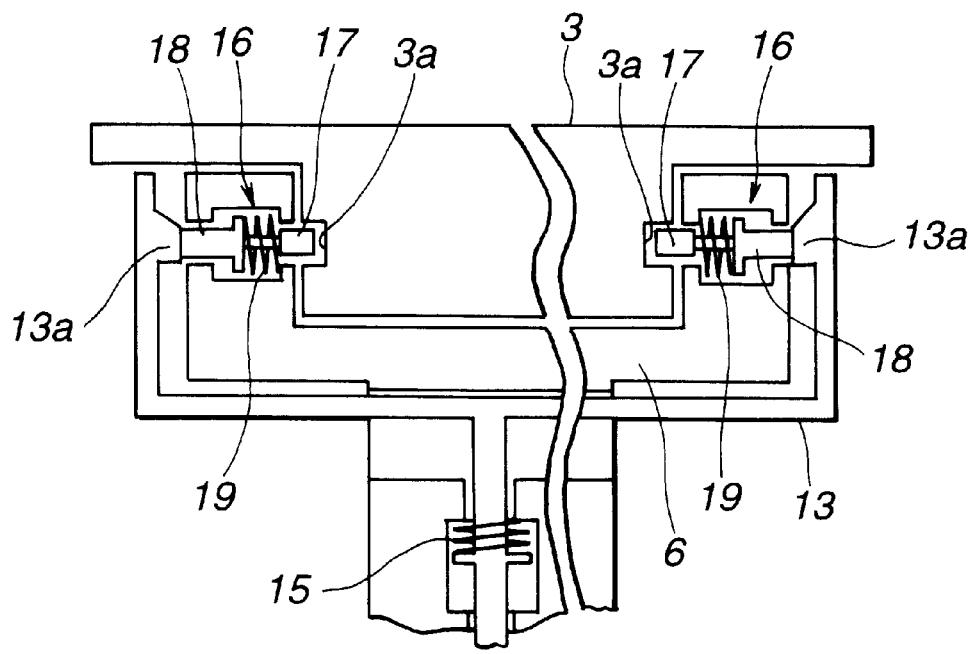
FIG. 8 is a cross-sectional view taken along line B—B shown in FIG. 7 (when the locking mechanism is in an on-state)
Figure 9:
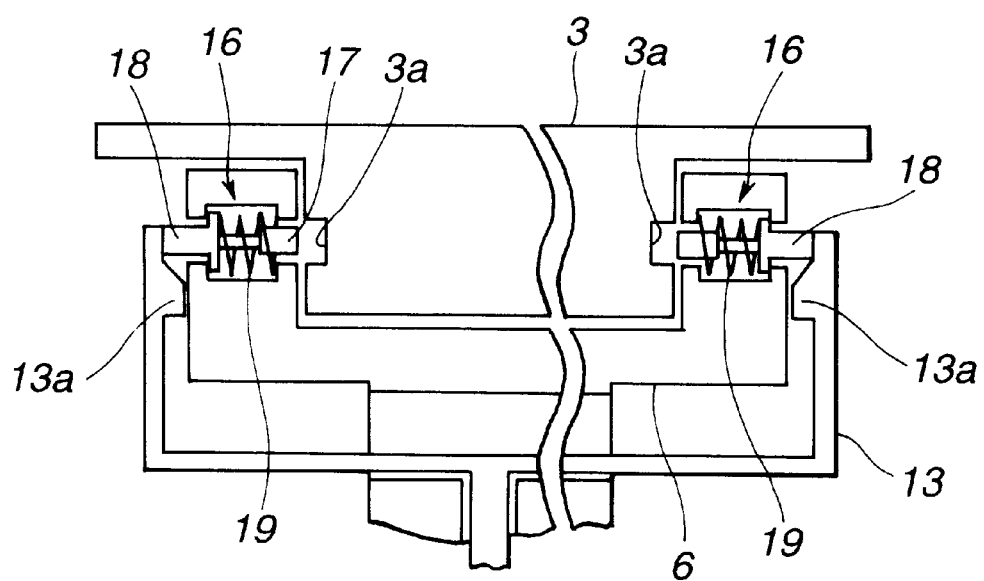
FIG. 9 is a cross-sectional view taken along line B—B shown in FIG. 7 (when the locking mechanism is in an off-state)

Next, the detailed configuration of the hinges A10 and the B10 will be described with reference to FIGS. 6–9. FIG. 6 is a cross-sectional view taken along line A—A shown in FIG. 5. FIG. 7 is a side view illustrating the configuration of a locking mechanism. FIGS. 8 and 9 are cross15 sectional views taken along line B—B shown in FIG. 7: FIG. 8 illustrates a state when the locking mechanism is in an on-state; and FIG. 9 illustrates a state when the locking mechanism is in an off-state.

The original-pressing plate 3 incorporating the display device 2 is mounted on the original-mount 6 so as to be rotatable around the hinges A10 or B10.

As shown in FIG. 7, both knobs A11 and B11 are connected to a link 12. By operating one of the knobs A11 and B11, the link 12 moves to the right or left. A cam 14 is mounted on an end portion of the link 12. The lower end of a link 13 urged downward by a spring 15 contacts the cam 14.

As shown in FIGS. 8 and 9, locking mechanisms 16 are provided between the original-mount 6 and the original-pressing plate 3. Each of the locking mechanisms 16 includes a recess 3a formed at a side portion of the original-pressing plate 3, a locking pin 17 and an engaging pin 18 slidably held on the original-mount 6, and a spring 19 provided between these pins 17 and 18. Cams 13a are formed on the link 13. Each of the cams 13a is configured so as to selectively engage with the engaging pin 18 of the corresponding locking mechanism 16.

Figure 18:
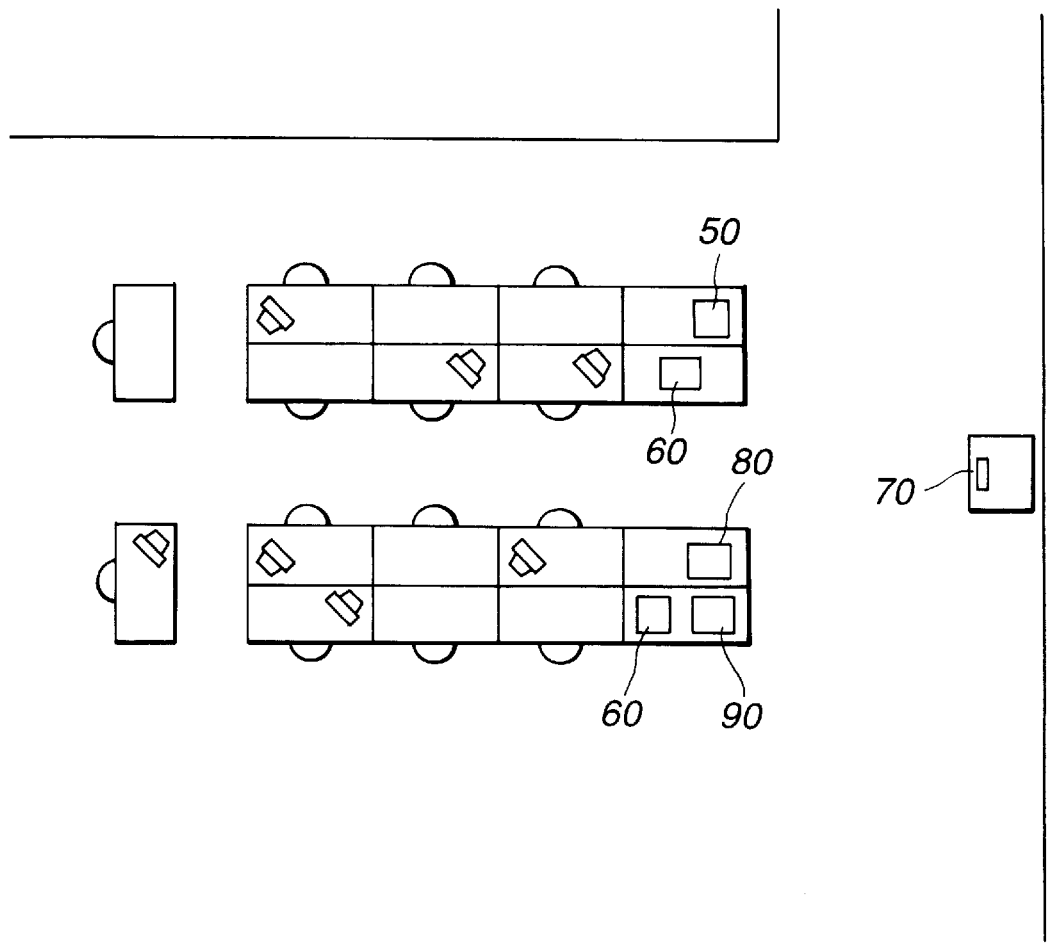
FIG. 18 is a diagram illustrating a conventional office layout.
Figure 19:
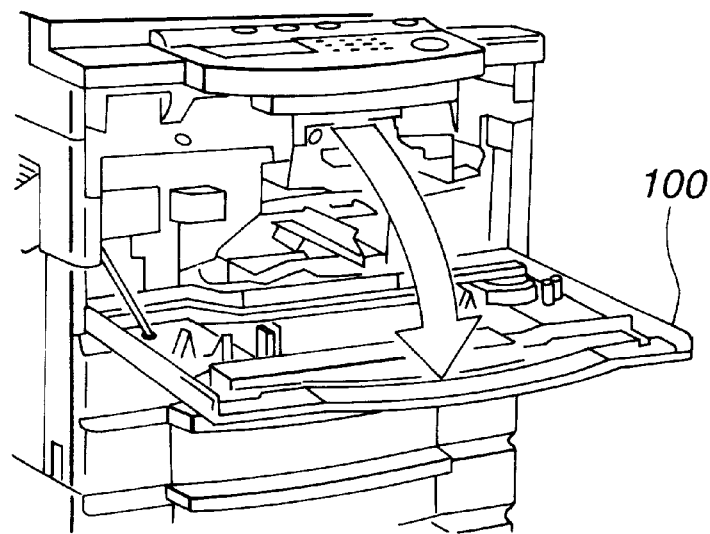
FIG. 19 is a perspective view illustrating processing of removing a sheet jam in a coventional copier.
Figure 20:
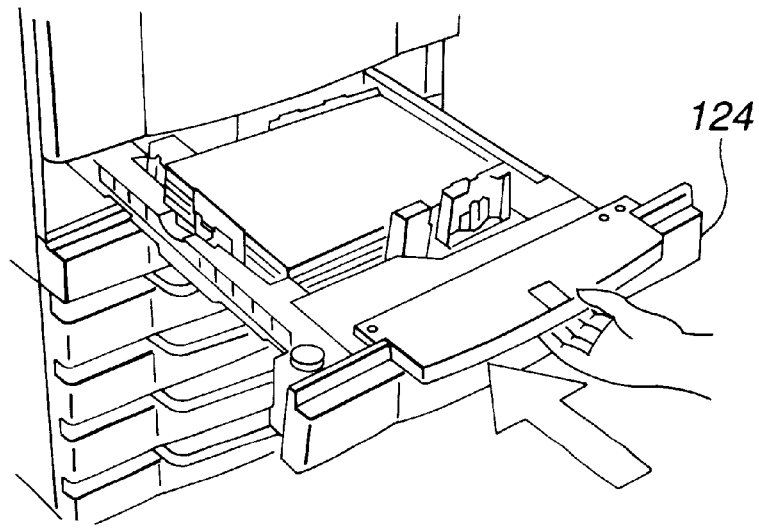
FIG. 20 is a perspective view illustrating a sheet replenishing operation in a conventional copier.

When the knob A11 (B11) is not operated, the link 13 whose lower end contacts the cam 14 is in an uppermost position as indicated by solid lines in FIG. 7. As shown in FIG. 18, the engaging pins 18 of the locking mechanisms 16 are pressed by the cams 13a formed on the link 13, and the locking pins 17 engage with the recesses 3a of the original-pressing plate 3 by being pressed toward the original-pressing plate 3 by the urging force of the spring 19. As a result, the locking mechanisms 16 assume an on-state, so that the fixing of the original-pressing plate 3 with respect to the original-mount 6 is locked.

On the other hand, if the knob A11 (B11) is operated so as to be rotated in a counterclockwise direction as indicated by broken lines in FIG. 7, the link 12 and the cam 14 moves to the right, so that the link 13 contacting the cam 14 moves downward. The pressure of the engaging pins 18 caused by the cams 13a formed on the link 13 is thereby released, as shown in FIG. 9. As a result, the engaging of the locking pins 17 with the recesses 3a is released to make the locking mechanisms 16 in an off-state, so that the fixing of the original-pressing plate 3 with respect to the original-mount 6 is released.

Figure 10:
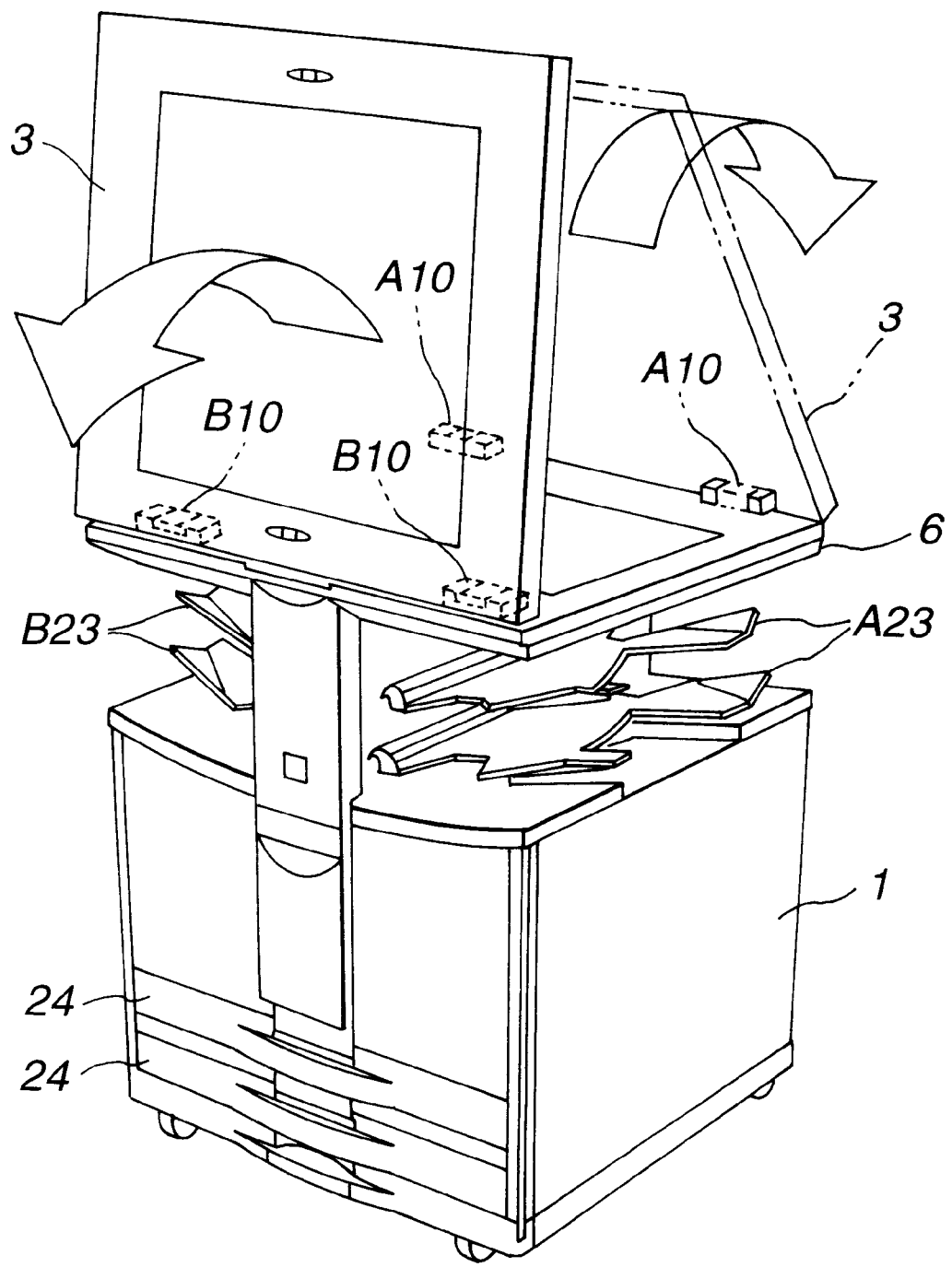
FIG. 10 is a perspective view of the composite apparatus in which the original-pressing plate is opened.

Accordingly, for example, if the right knob A11 is grasped from the right side in FIG. 7 in order to open the original-pressing plate 3, the locking mechanisms 16 for locking the fixing of the original mount 6 and the original-pressing plate 3 by the right hinge A10 is made to be in an off-state, and the locking mechanisms 16 of the hinge B11 at the opposite side connected to another link 20 is made to be in an on-state. Hence, by operating one of the knobs A11 and B11 provided at two sides of the original-pressing plate 3, the locking mechanisms 16 of the facing hinges A10 or B10 are made to be in an on-state, so that it is possible to open the original-pressing plate 3 in one direction, and thereby to open/close the original-pressing plate 3 from any one of two directions, as shown in FIG. 10.

Figure 11:
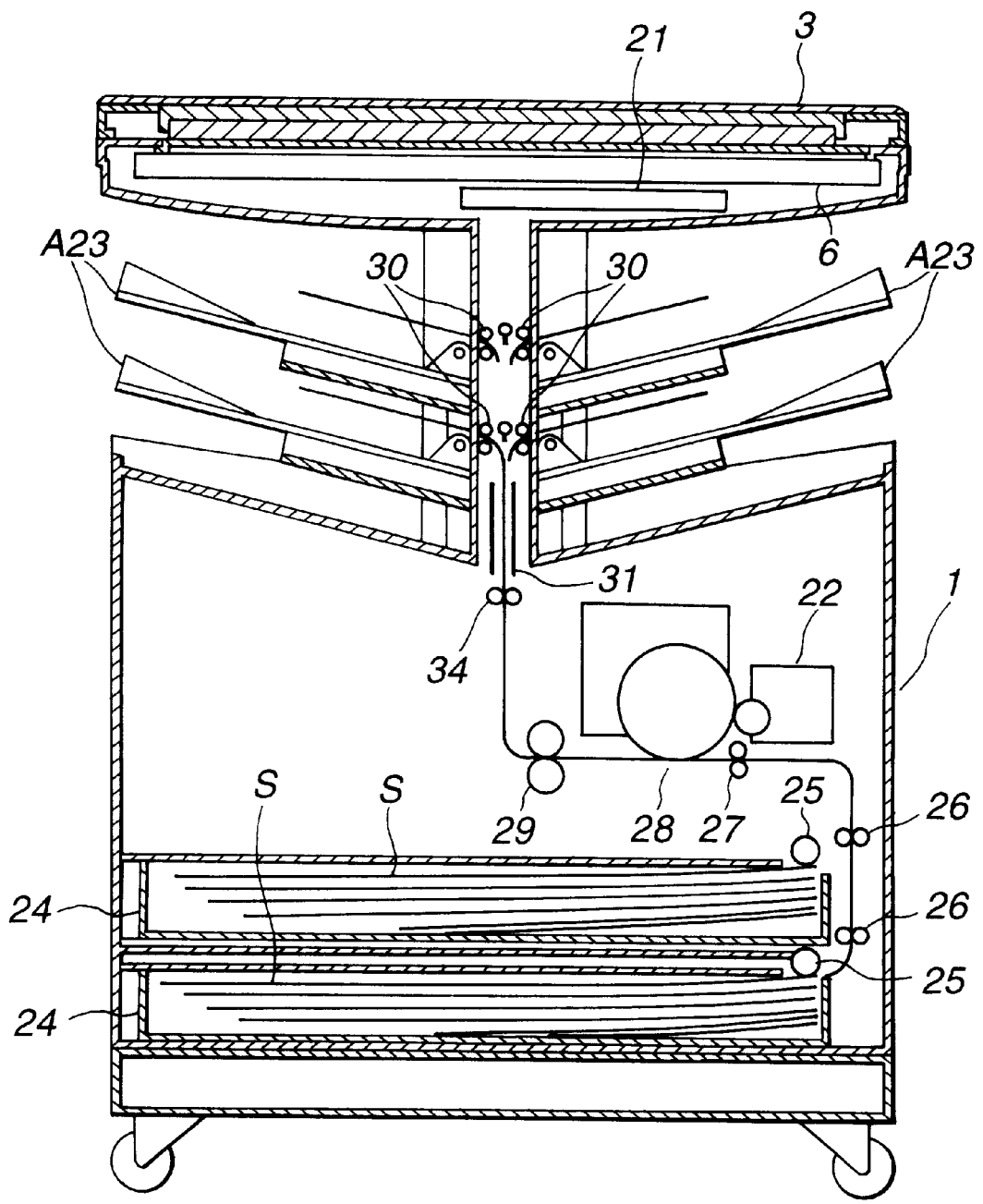
FIG. 11 is a vertical cross-sectional view of the composite apparatus.

When using, for example, the composite apparatus as a copier, after inputting the number of copies and the output density on the display device 2, a copying operation is started. Thus, an image on an original is read on the original-mount 6 using a contact-type sensor or the like shown in FIG. 11. After performing image formation by an image processing unit 21, an image is formed on a recording sheet S by an image forming unit 22 using a well-known electrophotographic process having an electrophotographic photosensitive member.

Next, a description will be provided of a conveying mechanism for conveying a recording sheet S onto one of discharged-sheet trays A23 or B23 provided at two sides of the main body 1.

The uppermost sheet of recording sheets S accommodated within one of recording-sheet cassettes 24 provided vertically in two stages at lower portions of the main body 1 is fed from the corresponding sheet feeding cassette 24 by a corresponding one of sheet feeding rollers 25, and is conveyed toward registration rollers 27 by conveying rollers 26. Then, the recording sheet S is fed to the image forming unit 22, where a toner image formed in the image forming unit 22 is transferred onto the recording sheet S by a transfer charging unit 28. The recording sheet S having the toner image transferred thereon is conveyed to a fixing unit 29, where the toner image on the surface of the recording sheet S is fixed by being heated and pressed. Then, the recording sheet S having the fixed toner image thereon is discharged onto one of the discharged-sheet trays A23 or B23 provided outside the main body 1 by sheet discharging rollers 30.

Figure 12:
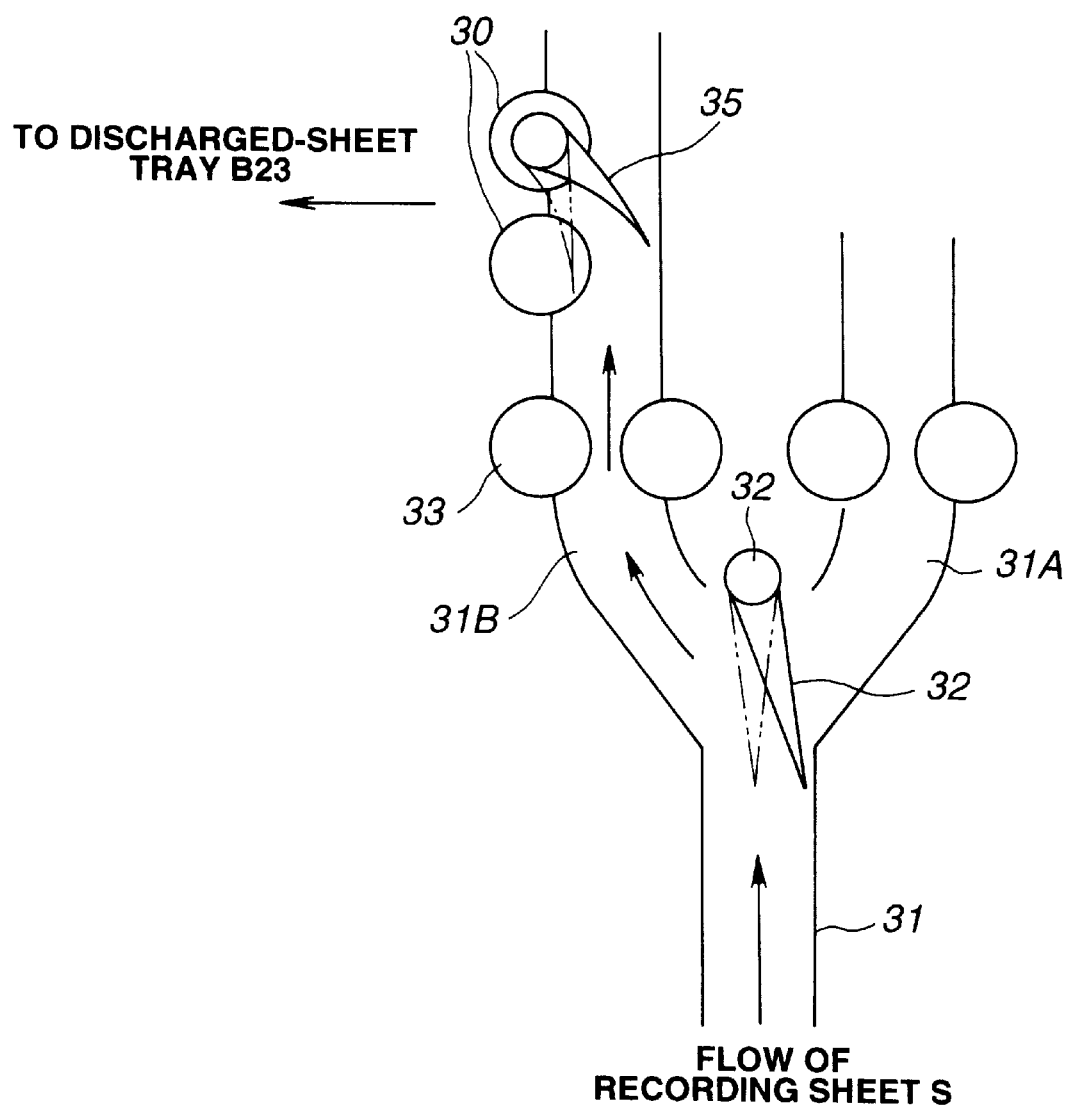
FIG. 12 is a diagram illustrating the operation of a movable guide plate.

A mechanism for changing the tray onto which the recording sheet S is to be discharged between the discharged-sheet trays A23 and B23 provided at two portions of the apparatus will now be described with reference to FIG. 12.

The recording sheet S passing through the fixing unit 29 is fed to a conveying path 31 by sheet discharging conveying rollers 34. After the recording sheet is fed to one of pairs of sheet discharging rollers 33 and 34 provided at the left and at the right by a movable guide plate 32, it is discharged onto the corresponding one of the external discharged-sheet trays B23 and A23, respectively.

The movable guide plate 32 provided in the conveying path 31 is rotatable to the left and right around a fulcrum 32a so as to close one of conveying paths 31A and 31B and simultaneously open another path. For example, as shown in FIG. 12, when discharging the recording sheet S onto the left-side discharged-sheet tray B23 the movable guide plate 32 moves to the right around the fulcrum 32a as indicated by solid lines, in order to guide the recording sheet S rising by passing through the conveying path 31 in the direction of the left-side sheet discharging rollers 33. At the same time, a guide plate 35 provided coaxially with one of the sheet discharging rollers 30 is raised as indicated by solid lines, in order to block a conveying path 31B which goes further upward, and thereby to discharge the recording sheet S onto the discharged-sheet tray B23.

Figure 13:
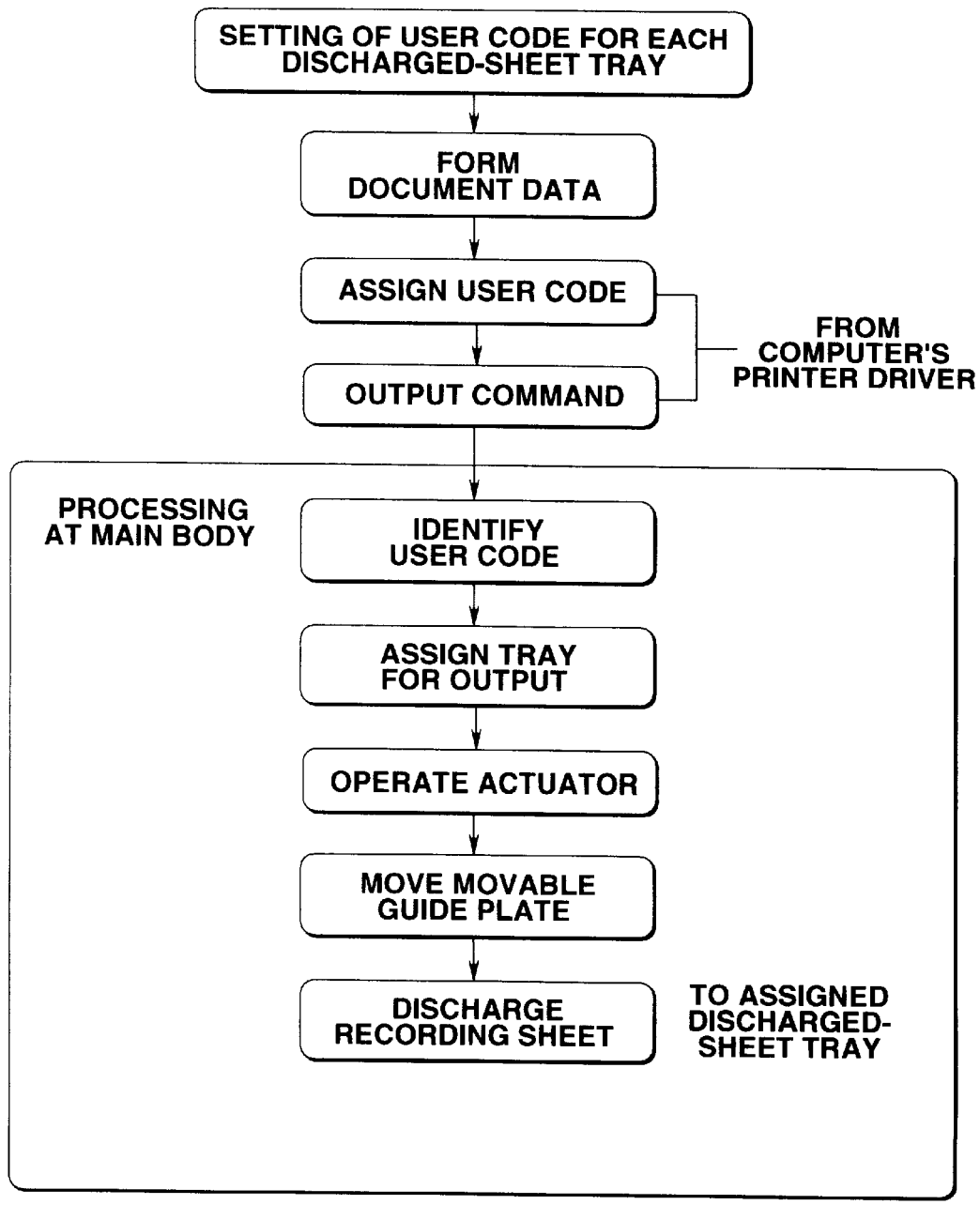
FIG. 13 is a flowchart illustrating the processing of a mechanism for changing a discharged-sheet tray onto which a recording sheet is to be discharged.

As can be understood from the flowchart shown in FIG. 13, the movable guide plates 32 and 35 are driven by an electromagnetic actuator or the like by identifying a preset user code based on an output command from the operational portion or a printer driver of a computer.

Figure 14:
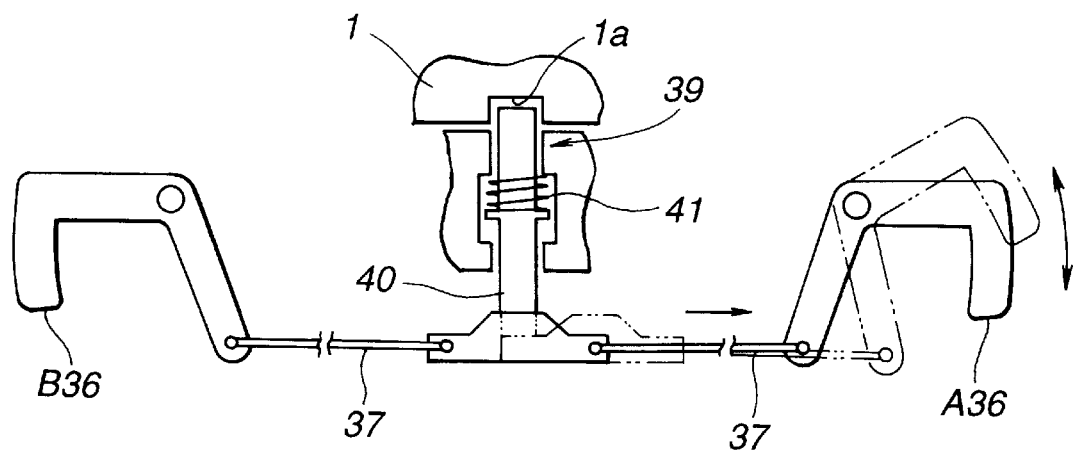
FIG. 14 is a diagram illustrating a locking mechanism of a recording-sheet cassette.
Figure 15:
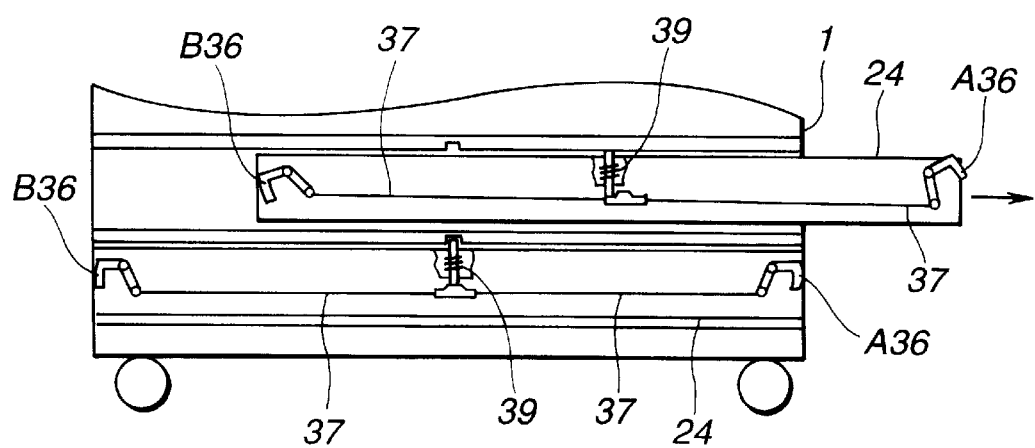
FIG. 15 is a side view of a lower portion of the composite apparatus illustrating a direction of draw of the recording-sheet cassette.

Next, a description will be provided of a mechanism which can draw the sheet feeding cassette 24 in a forward or backward direction, with reference to FIGS. 14 and 15.

Locking release knobs A36 and B36 for drawing the sheet feeding cassette 24 are provided at front and rear portions of the sheet feeding cassette 24, respectively. One end of each link 37 is connected to the corresponding one of the locking release knobs A36 and B36,, and a cam 38 is mounted on another end of the link 37.

A locking mechanism 39 is provided between the main body 1 and the recording-sheet cassette 24. The locking mechanism 39 includes a recess 1a formed in the main body 1, a lock pin 40 held on the recording-sheet cassette 24 so as to be vertically movable, and a spring 41 for urging the lock pin 40 upward. The lower end of the lock pin 40 contacts the cam 38.

When the locking release knobs A36 and B36 are not operated, the lock pin 40 whose lower end contacts the cam 38 is at an uppermost position, as indicated by solid lines shown in FIG. 14. Since an upper end portion of the lock pin 40 engages with the recess 1a of the main body 1, the locking mechanism 39 is maintained in an on-state, so that the drawing of the recording-sheet cassette 24 is locked.

On the other hand, when one of the locking release knobs A36 and B36 is grasped and rotated in a counterclockwise direction as indicated by the broken lines in FIG. 14, the link 37 and the cam 38 move, to lower the lock pin 40 whose lower end contacts the cam 38 by the urging force of the spring 41. The engaging of the upper end portion of the lock pin 40 with the recess 1a is thereby released, to make the locking mechanism 39 in an off-state. As a result, the recording-sheet cassette 24 can be drawn from the main body 1.

Since the links 37 are connected to both of the locking release knobs A36 and B36, the recording-sheet cassette 24 can be drawn by making the locking mechanism 39 in an off-state by operating from any of two directions.

For example, when the locking release knob A36 is grasped in order to draw the recording-sheet cassette 24 to the right, the link 37 and the cam 38 connected to the locking release knob A36 move to the right in FIG. 14. The lock pin 40 is thereby lowered to release the engaging between the lock pin 40 and the recess 1a. As a result, as shown in FIG. 15, the recording-sheet cassette 24 can be drawn to the right.

Figure 16:
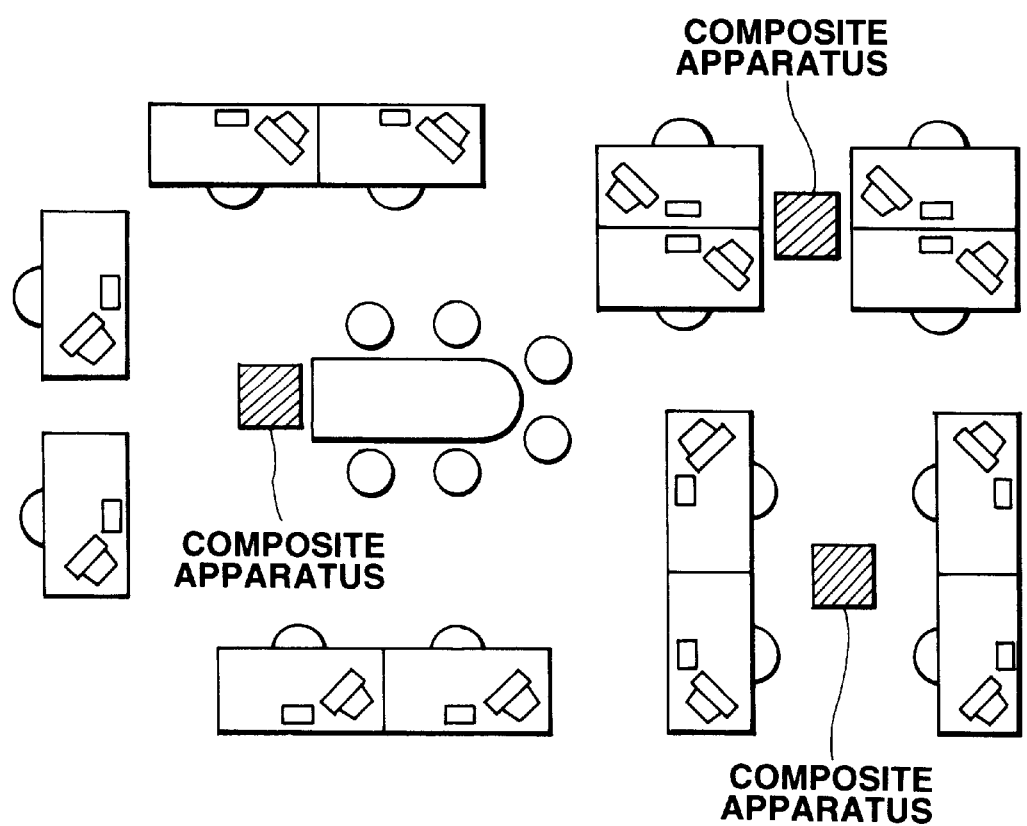
FIG. 16 is a diagram illustrating an office layout using composite apparatuses according to the present invention.
Figure 17:
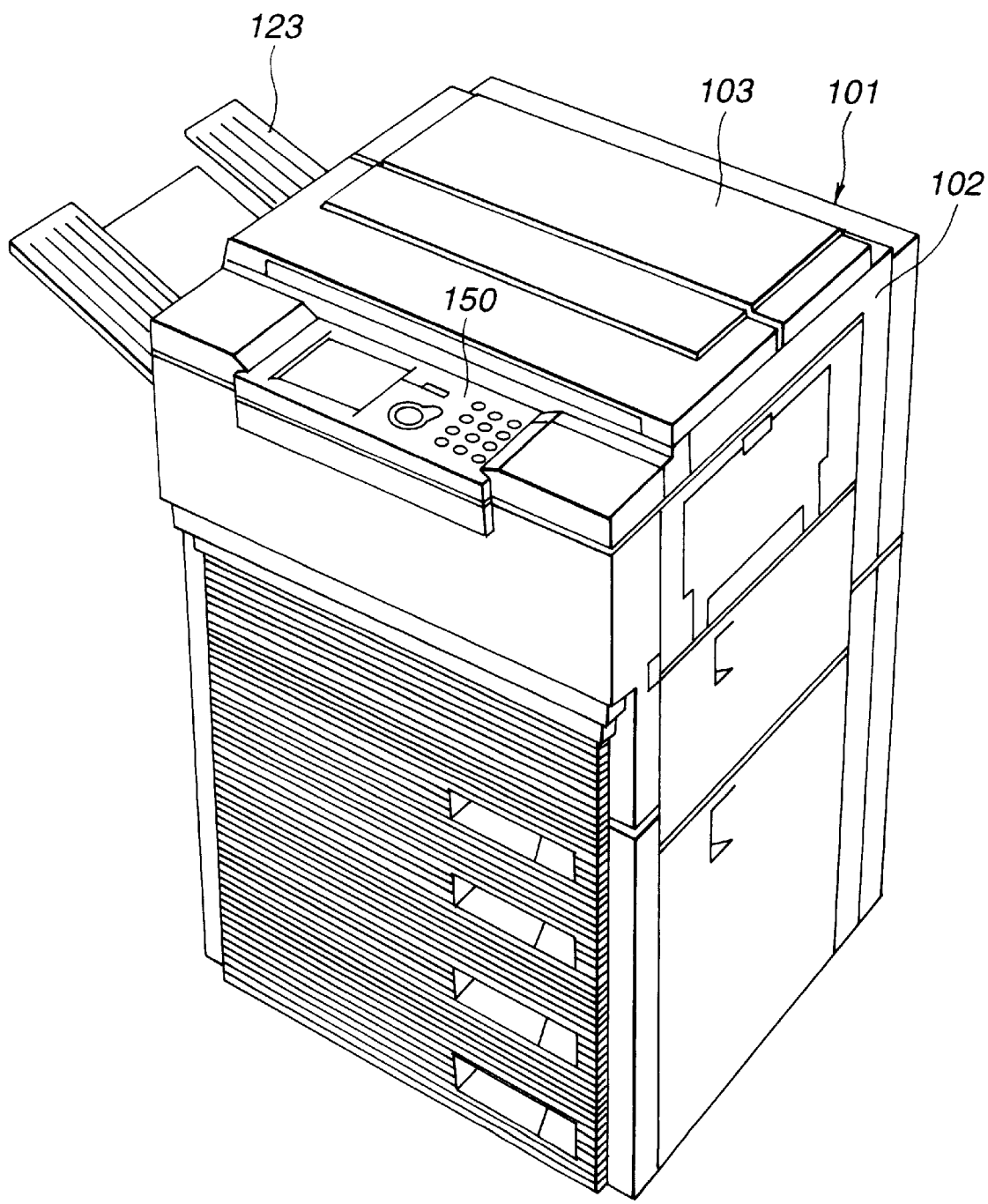
FIG. 17 is a perspective view illustrating a conventional copier.

As described above, in the composite apparatus of the embodiment, as shown in FIG. 10, the original-pressing plate 3 having the display device 2 is arranged to be opened/closed in two directions around the hinges A10 and B10 provided at front and rear portions, and as shown in FIG. 5, reading of an original can be started by operating one of the start keys 8 provided at two facing sides. Hence, it is possible to realize an efficient office layout, for example, by arranging composite apparatuses as shown in FIG. 16.

The display device 2 of the composite apparatus of the embodiment includes touched-position detection means for detecting a touched position on its flat display surface, and control means for operating the main body 1 and a method for displaying a document or the like on the display device 2.

The display device 2 may display the state of a read original before recording, as well as electronized document information before being recorded on a recording sheet S.

The display device 2 may also display an image and document information necessary for two-way communication with a remote location by a facsimile apparatus, an Internet function or the like by guiding the original-pressing plate 3 holding the display device 2 to a desired visible position.

The composite apparatus may include means for performing a plurality of processes for some or all of a document/image copying apparatus, an input apparatus, an output apparatus, a transmission apparatus, a recording apparatus, a video conference system apparatus and the like in the same apparatus according to the same operational procesure displayed on the same display device. Furthermore, the display device may record a document and image information from an information terminal, such as a personal computer or the like, on a recording sheet, and perform data transfer or the like required in two-way communication with a remote location, or the like by means of radio or infrared wireless transmission.

As is apparent from the foregoing description, according to the present invention, a composite apparatus includes display means having a flat display surface capable of displaying an operational portion and information, provided above original-reading means of the main body of the apparatus. Hence, it is possible to operate the apparatsus from many directions, and to realize an efficient office layout.

The individual components shown in outline in the drawings are all well known in the composite apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A composite apparatus comprising:

a business-machine main-body apparatus having at least a copying function and a printer function;

display means, also operating as an original-pressing plate, having a flat display surface for displaying an operational function and other information, said display means being provided above original-reading means of said main-body apparatus; and recording-sheet conveying means or discharging a recording sheet to a position where the recording sheet can be taken out from one of two directions, a right side and a left side, with respect to said main-body apparatus.

2. A composite apparatus comprising:

a business-machine main-body apparatus having at least a copying function and a printer function; and display means, also operating as an original-pressing plate, having a flat display surface for displaying an operational function and other information, said display means being provided above original-reading means of said main-body apparatus, wherein according to an input device disposed at two sides or four sides of said main-body apparatus, a direction of a user's operation is recognized and a direction of display of a display picture surface of an operational portion displayed on said display means is directed to the direction of the user's operation.

3. A composite apparatus comprising:

a business-machine main-body apparatus having at least a copying function and a printer function; and display means, also operating as an original-pressing plate, having a flat display surface for displaying an operational function and other information, said display means being provided above original-reading means of said main-body apparatus, wherein a picture-surface operation from two sides or four sides of said main-body apparatus, a reading operation by said original-reading means, and an operation of taking out a recording sheet are allowed.

4. A composite apparatus comprising:

a business-machine main-body apparatus having at least a copying function and a Printer function; and display means, also operating as an original-pressing plate, having a flat display surface for displaying an operational function and other information, said display means being provided above original-reading means of said main-body apparatus, wherein said display means comprises input means for assigning a discharged-sheet tray disposed at a right side or a left side for receiving a recording sheet, so as to discharge the recording sheet onto the assigned tray for each individual or each date.

5. A composite apparatus comprising:

a business-machine main-body apparatus having at least a copying function and a printer function; and display means, also operating as an original-pressing plate, having a flat display surface for displaying an operational function and other information, said display means being provided above original-reading means of said main-body apparatus, wherein said display means causes output of a recording sheet onto a discharged-sheet tray present in an arbitrary direction according to assignment by an operator.

6. A business machine comprising:

a display;

position detecting means for detecting a position of an operator; and image direction control means for controlling a direction of an image displayed by said display in accordance with an output of said position detecting means.

7. A business machine according to claim 6, wherein said position detecting means is provided on at least two surface of said machine.

8. A business machine according to claim 6, wherein said display is provided on almost the center of an upper surface of said machine.

9. A business machine according to claim 6, further comprising a reading means for optically reading an original, and a pressing plate for pressing the original mounted on an original mounting plate, wherein said display is provided on almost the center of said pressing plate.

10. A business machine according to claim 9, further comprising at least two keys for operating said reading means, each of said keys being provided on the corner of said machine.

11. A business machine according to claim 9, wherein said pressing plate can open and close to at least two directions of said original mounting plate.

12. A business machine comprising:

an original mounting plate;

a pressing plate for pressing an original mounted on said original mounting plate; and a display for displaying an information, said display being mounted on an upper surface of said pressing plate.

13. A business machine according to claim 12, further comprising a means for changing a direction of an image displayed by said display.

* * * * *

UNITED STATES PATENT AND TRADEMARK OFFICE
CERTIFICATE OF CORRECTION

PATENT NO.    : 6,163,668                                    Page 1 of 1
DATED         : December 19, 2000
INVENTOR(S)   : Masaki Takahashi, et al.

It is certified that error appears in the above-identified patent and that said Letters Patent is hereby corrected as shown below:

Column 4,
Line 60, "cross15 sectional" should read -- cross-sectional --.

Column 5,
Line 30, "moves should read -- move --.

Column 7,
Line 16, "of" should be deleted; and
Line 56, "procesure" should read -- procedure --.

Column 8,
Line 61, "Printer" should read -- printer --.

Column 9,
Line 26, "surface" should read -- surfaces --.

Signed and Sealed this

Seventh Day of August, 2001

*Attest:*

*Attesting Officer*

NICHOLAS P. GODICI
*Acting Director of the United States Patent and Trademark Office*